United States Patent [19]

Snyder

[11] Patent Number: 4,581,090

[45] Date of Patent: Apr. 8, 1986

[54] SURFACE RECONDITIONING ARRANGEMENT

[76] Inventor: Hal R. Snyder, Rte. 2, Washington Ave., Apt. 1, Lewisport, Ky. 42351

[21] Appl. No.: 522,982

[22] Filed: Aug. 15, 1983

[51] Int. Cl.[4] ........................ B32B 31/00; B32B 35/00; E04B 2/00; B05D 1/12

[52] U.S. Cl. ........................................ 156/279; 156/71; 156/94; 427/140; 427/186; 428/150

[58] Field of Search ........................... 156/71, 94, 279; 427/140, 186–192, 202, 203, 204, 205; 428/141, 145, 150

[56] References Cited

U.S. PATENT DOCUMENTS

| | | | |
|---|---|---|---|
| 2,853,413 | 9/1958 | Christian | 156/279 X |
| 4,241,107 | 12/1980 | Mandish et al. | 156/279 X |

*Primary Examiner*—William A. Powell

*Attorney, Agent, or Firm*—Warren D. Flackbert

[57] ABSTRACT

A surface reconditioning arrangement characterized by the application of successive layers of an adhesive material, such as varnish, and a granular material, such as sand, onto an imperfect or weathered surface, as, for example, a vinyl automobile roof top, roofing and siding for building structures, and the like. The arrangement is such that the aforesaid surface becomes reconditioned for longer life and, as well, presents a like new appearance. Moreover, the finished surface affords optimum physical properties, including, oftentimes, a decorative glistening effect. The granular material is typically contained within a reservoir which, upon actuation of an air valve, is caused to pass from a portable distributor onto the desired surface, thus overlaying the latter by combining successive passes of granular material and adhesive material.

6 Claims, 5 Drawing Figures

AIR

SURFACE RECONDITIONING ARRANGEMENT

As is known, the usage of asphalt type roofing and siding, and vinyl automobile tops, is widespread, where, however, through exposure to direct sunlight and/or a variety of weather conditions, such usually fade and, in the instance of roofing, become susceptible to water leakage and the like. In order to achieve longer usage, either costly replacement, repair and/or reconditioning has been a requirement, oftentimes, also being at the expense of appearance.

The invention overcomes the preceding by presenting an arrangement whereby a granular material, such as sand, for example, is successively deposited over layers of an adhesive material, such as a polyurethane varnish, in a built-up or layered relationship. The granular material is broadcast through a portable distributor, with a preselected mouth configuration, communicating, by means of a flexible conduit, to a reservoir for the aforesaid granular material.

The granular material flows by gravity towards the bottom of the reservoir as such is forced from the latter, to the distributor, by means of pressurized air. The coating operation is controlled by the hand actuation of a conventional valve located in an air compressor line.

In use, as where either a vinyl automobile top or the roof or siding of a building structure, for example, is involved, a layer of adhesive material is first applied to a surface, by hand or as otherwise deemed appropriate, where, subsequently, the granular material is deposited from the distributor in a series of covering passes, the latter being accomplished through the mentioned pressurized air system. As required, other layers of adhesive material and granular material are successively deposited, depending, for example, upon the amount of area under process and/or the desired end utilitarian and/or visual effect.

The invention, therefore, serves to provide added life to a weathering surface, i.e. one which may crack and-/or permit water passage with age. A variety of preselected adhesive materials may be employed and, as well, the choice of granular materials, where the latter may vary in particle size. In some instances, a glistening effect can or will be achieved due to the physical properties of the granular material, adding inherent interest to the finished item.

In any event, a better understanding of the present invention will become more apparent from the following description, taken in conjunction with the accompanying drawing, wherein FIG. 1 is a view in side elevation, partly fragmentary and partly in vertical section, showing a typical surface reconditioning arrangement in accordance with the teachings of the invention;

Figures 1, 2, 3, 4, 5:
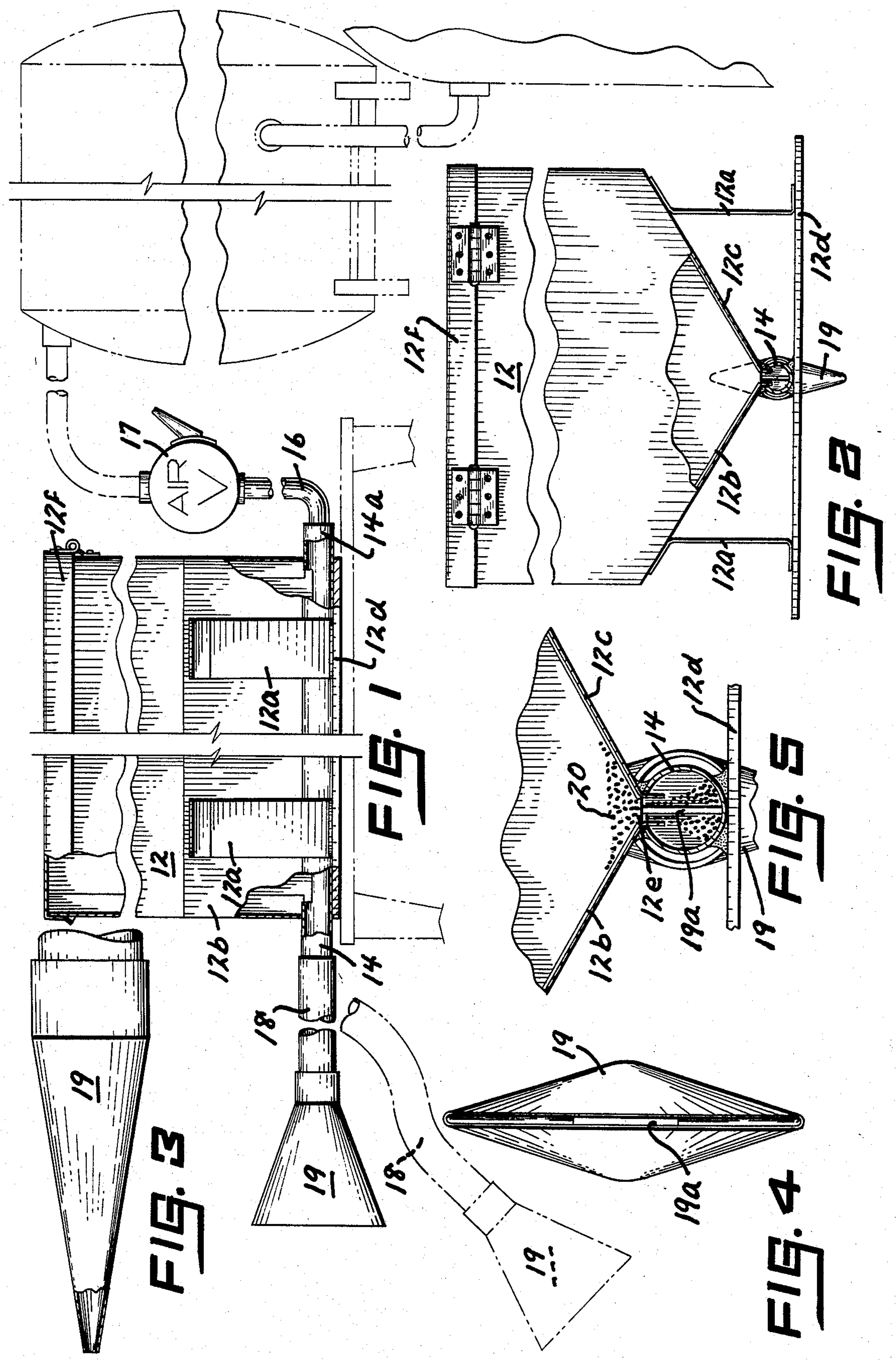
FIG. 2 is a view in end elevation, looking from right to left in FIG. 1, showing certain details of the arrangement of such figure.
FIG. 3 is an enlarged view in side elevation of a typical distributor employed by the invention.
FIG. 4 is a view in end elevation, looking from left to right in FIG. 1, detailing the distributor thereof; and, FIG. 5 is an enlarged fragmentary view in vertical section of the relationship between the granular material receiving reservoir, the outlet therefrom, and the distributor.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, where the disclosed structure is representative of that typically used in the practice of the invention, the instant surface reconditioning arrangement includes a reservoir 12 for receiving granular material 20, such being supported by legs 12*a* positioned on a base 12*d*. The latter may be selectively placed on a supporting table or other work surface (shown in phantom).

As particularly evident in FIG. 2, the reservoir 12 includes downwardly and inwardly angled bottom walls 12*b*-12*c* opening along its length, at 12*e*, into a conduit 14. The angled configuration of walls 12*b*-12*c* permit the gravity feeding or flow of the granular material 20 stored therein into the conduit 14 (see FIG. 5).

As shown in FIG. 1, conduit 14 extends the length of the reservoir 12, receiving at its entry end 14*a* pressurized air flowing in a line 16 from a conventional air pressure tank and compressor (both shown in phantom). A common hand actuated air valve 17 is included in line 16, serving, as to be discussed, to initiate flow of the granular material 20 from the conduit 14.

As to the latter, the conduit 14 also communicates with a flexible hose 18 which has a distributor 19 at the free end thereof. As particularly evident in FIGS. 1, 3 and 4, the distributor 19 typically is fan-shaped, i.e. flares outwardly, and presents an elongated relatively narrow slot-like mouth 19*a*. The side-to-side width of the latter is significant in affording a large throw of granulated material 20 during each pass of the distributor 19, but, of course, the mouth 19*a* can assume any shape, depending upon particular usage requirements. FIG. 2 further details the assembly, including a hinged lid 12*f* for the reservoir 12.

An important feature of the overall structure is the portability in use afforded by the distributor 19, i.e. its ability for ready hand usage in connection with depositing a layer, or successive layers, of granular material 20 on any desired surface, and particularly in the reconditioning of automobile tops, roofs and siding of building structures, ceiling tile, house trailer and recreational vehicle trailer tops, and the like, each of the latter necessitating maneuverability during coating, and at various location sites, in contrast to the use of a fixed and closed coating chamber.

In any event, the employed granular material 20 can be, for example, river sand having any desired grit; white Florida sand; black low silica material of any desired grit; fine river gravel; crushed white rock; and, plastic chips (where the latter are typically not over 1/16" thick or ¼" in diameter). In order to achieve the desired coating, an adhesive material must be employed in conjunction with the granular material 20, i.e. the latter is broadcast over the former in successive layers.

In a typical practice of the invention, the adhesive material, which also serves sealing purposes, is classified, by way of example, as a polyurethane varnish consisting essentially of a non-volatile alkyd modified polyurethane and volatile mineral spirits. In the alternative, a polyurethane flat varnish is also usable where such consists essentially of silica, alkyd modified polyurethane resin, mineral spirits, and driers. In addition, and in order to achieve a desired color, or color matching, paints or pigments are also employed, selectable from available color reducers and acrylic urethane, clear and/or as a catalyst.

In a representative reconditioning application procedure, the involved surface area, as an automobile and/or truck top, a house trailer and/or recreational vehicle top, ceiling tile, a flat roof of a building structure or a shingle roof or the siding of a building structure, each require cleaning, if necessary, followed by the application, in any appropriate manner, of a preselected adhesive material, the latter being spread to cover all desired exposed areas.

After a drying period, a color coat is applied, followed by a layer of the granular material 20. If necessary, dependent, for example, upon the condition of the surface under process, the aforesaid steps can be repeated, all followed by a drying period, where the latter can also involve the application of heat.

In other words, a primary purpose of the invention is in connection with reconditioning and/or presenting a new surface for a weathered, imperfect, or otherwise marred surface, representing considerable savings to the user, as in eliminating the necessity of replacing an entire roof or placing a second roof on an existing roof. In contrast, through the successive passes of adhesive material and granular material, a professional appearing and quite durable reconditioned surface area is achieved. As stated heretofore, and depending upon the choice of granular material, such reconditioned area could also afford a glistening effect, i.e. one which presents eye appeal to the surface involved, as, for example, the instance of a reconditioned vinyl automobile roof.

While, obviously, spray coating per se is not new, the invention's main objective is, as stated, in revitalizing difficult to repair/replace and/or weathered surface areas which heretofore required costly and time consuming procedures. The portability of the distributor simplifies the broadcasting of granular material, by repeated passes, over the area under process. As apparent, the materials employed in the practicing of the arrangement are readily available, making the realization of a customized coating application easily accomplishable. In other words, versatility in end results keynotes the invention, lending commercial advantages.

The surface reconditioning or coating arrangement described hereabove is susceptible to various changes within the spirit of the invention, including the use of specialized materials and equipment to satisfy any particular job requirement, and, thus, such is to be considered illustrative and not as limiting the scope of the following claims:

I claim:

1. The method of reconditioning an existing surface from a first imperfect condition to a second treated condition which comprises the steps of overlaying a layer of an adhesive material to cover all exposed areas of said existing surface at said first imperfect condition, said adhesive material being in a family including a varnish, and applying a granular material over said adhesive layer in a covering relationship to achieve said second treated condition, said granular material being in a family including a sand, fine gravel, crushed rock and small plastic particles.

2. The method of claim 1 where said existing surface is asphalt siding.

3. The method of claim 1 where said adhesive material and said granular material are successively applied.

4. The method of claim 1 where a layer of coloring material is selectively applied.

5. The method of claim 1 where said existing surface is the roof of a vehicle.

6. The method of claim 1 where said existing surface is the asphalt roof of a structure.

* * * * *